Nov. 3, 1925.
F. H. CRAGO
TRAP
Filed May 11, 1923
1,559,853
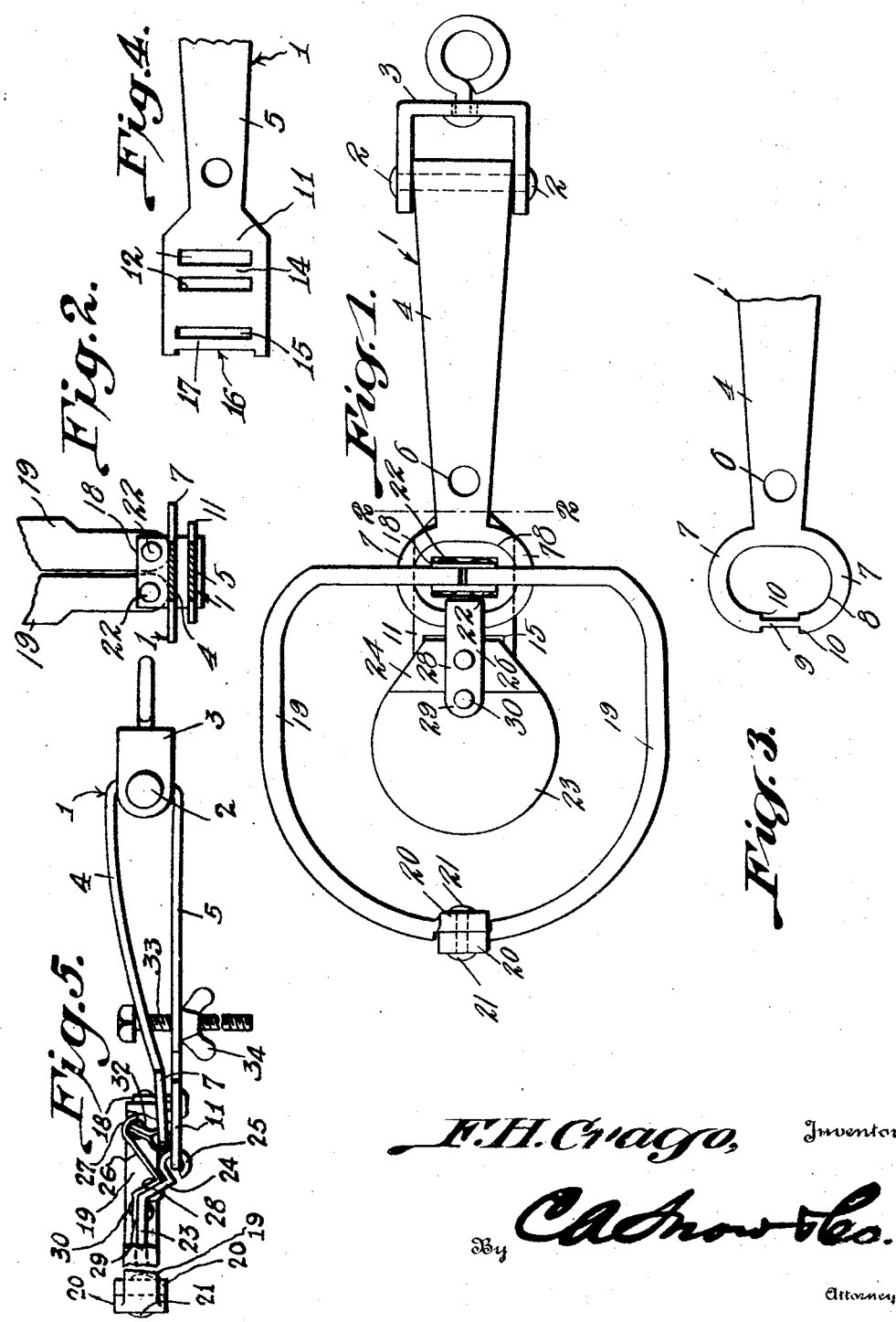
F. H. Crago, Inventor
By C. A. Snow & Co.
Attorney Patented Nov. 3, 1925.

1,559,853

UNITED STATES PATENT OFFICE.

FELIX H. CRAGO, OF MILLTOWN, MONTANA.

TRAP.

Application filed May 11, 1923. Serial No. 638,309.

*To all whom it may concern:*

Be it known that I, FELIX H. CRAGO, a citizen of the United States, residing at Milltown, in the county of Missoula and State of Montana, have invented a new and useful Trap, of which the following is a specification.

The device forming the subject matter of this application is a spring actuated jaw trap and one object of the invention is to provide novel means for assembling the jaws with the spring. A further object of the invention is to improve the trigger mechanism of the trap.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a trap constructed in accordance with the invention, the trap being set; Figure 2 is a section taken approximately on the line 2—2 of Figure 1; Figure 3 is a plan showing a portion of one of the arms of the spring; Figure 4 is a plan showing a portion of the other arm of the spring; Figure 5 is a side elevation of the trap, the same being set.

In carrying out the invention there is provided a U-shaped spring, which is denoted generally by the numeral 1. In the bend of the spring is located a pivot element 2, whereon a shackle 3 of any desired construction, is mounted. The upper arm of the spring 1 is marked by the numeral 4 and the numeral 5 designates the lower arm of the spring. The arms 4 and 5 are provided, near to their free ends, with registering openings 6, the function of which will be made manifest hereinafter. The arm 4 terminates in an enlarged loop-shaped head 7 provided with an opening 8, the outer portion of the head 7 being notched to fashion a pivot piece 9 and shoulders 10 at the end of the pivot piece. The arm 5 is provided with an enlarged head 11 in which there are transverse slots 12 forming a cross bar 14. In the head 11, adjacent to the free ends thereof, there is a slot 15, there being a notch 16 in the end of the head 11, the notch and the slot coacting to form a cross bar 17.

A U-shaped carrier 18 is provided. The carrier 18 extends about the cross bar 17 in the head 11 of the arm 5, and the arms of the carrier extend upwardly through the slots 12, the carrier 18 projecting upwardly through the opening 8 in the head 7 of the arm 4, when the trap is set, as shown in Figures 1 and 5. Arcuate jaws 19 are supplied, and are equipped at their outer ends with thickened bosses 20, through which passes a pivot element 21. The rear ends of the jaws 19 are received within the carrier 18, and are held thereon by pivot elements 22.

A trigger 23 is shown, and comprises a downwardly inclined arm 24 terminating in an eye 25, the eye being engaged through the slot 15 of Figure 4, about the cross bar 17 which is formed in the head 11 of the arm 5 of the spring 4. The trigger 23, thus, is mounted for swinging movement on the free end of the arm 5 of the spring 1. An inclined finger 26 is provided and terminates in a hook 27. The finger 26 comprises an extension 28 prolonged upwardly along the arm 24 the trigger 23 and terminating in a foot piece 29 superposed upon the trigger. Securing elements 30 connect the foot piece 29 with the trigger 23 and connect the extension 28 with the inclined arm 24 of the trigger, the finger 26 slanting upwardly and rearwardly, when the trap is set, as shown in Figure 5. A latch 31 is shown, and is mounted to swing on the pivot piece 9 of the arm 4, the shoulders 10 serving to prevent the latch 31 from shifting circumferentially on the head 7. The latch 31 may be made of a single piece of metal, the ends of which are connected by a securing device 32.

It is contemplated that a setting device may be used, the same being if desired, in the form of a bolt 33, a wing nut 34 being threaded on the bolt. The bolt 33 may be inserted through the alined openings 6 of the arms 4 and 5 of the spring 1, and by advancing the nut 34, the arms 4 and 5 may be compressed into the condition shown in Figure 5 of the drawings, the jaws 19 being swung to open position, the carrier 18 passing through the opening 8 of the arm 4, the trigger 23 being elevated, and the hook 27 on the finger 26 of the trigger being engaged with the latch 31, the latch being swung backwardly into the position shown in Figure 5. The setting device 33—34 is removed, and the trap then is in the condition depicted in Figure 5.

When an animal treads on the trigger 23, the trigger swings downwardly, and the hook 27 swings the latch 31 forwardly and downwardly, the hook ultimately becoming disengaged from the latch, and the jaws 19 swinging to closed position, under the impulse of the arm 4 of the spring 1, the lower rear ends of the jaws 19 being received in the opening 8 of the arm 4 and being held, thus, against opening, due to the tendency of the arm 4 to spring upwardly.

What is claimed is:—

1. In a trap, a spring comprising upper and lower arms, a carrier mounted on the lower arm, arcuate jaws having their outer ends pivotally united, the inner ends of the jaws being pivotally connected to the carrier, the upper arm cooperating with the jaws to close them, a latch pivoted to the upper arm, and a trigger located within the jaws when the trap is set, the trigger being pivoted to the lower arm, the trigger being provided with means for engaging the latch to hold the trap set.

2. In a trap, a spring comprising upper and lower arms, the upper arm having an opening, a carrier mounted on the lower arm and extended through the opening when the trap is set, arcuate jaws having their outer ends pivotaly united, inner ends of the jaws being pivoted to the carrier, a trigger located within the jaws when the trap is set, the trigger being pivoted to the lower arm, a latch pivoted to the upper arm and slanting backwardly from its pivotal mounting towards the spring when the trap is set, and a finger projecting from the trigger and engaged with the latch to swing the latch toward the trigger, and beyond the pivotal mounting of the latch when the trigger is depressed.

3. In a trap, a U-shaped spring comprising upper and lower arms, the upper arm having an opening, arcuate jaws, means for connecting the jaws pivotally at their outer ends, means for pivotally connecting the inner ends of the jaws with the lower arm of the spring through the opening in the upper arm, a latch pivotally mounted on the upper arm of the spring, a trigger mounted pivotally on the lower arm of the spring, and a finger projecting from the trigger and engaged with the latch to hold the jaws in set position.

In testimony that I claim the foregoing as my own, I have hereto affixed my signature.

FELIX H. CRAGO.